United States Patent Office 2,874,440
Patented Feb. 24, 1959

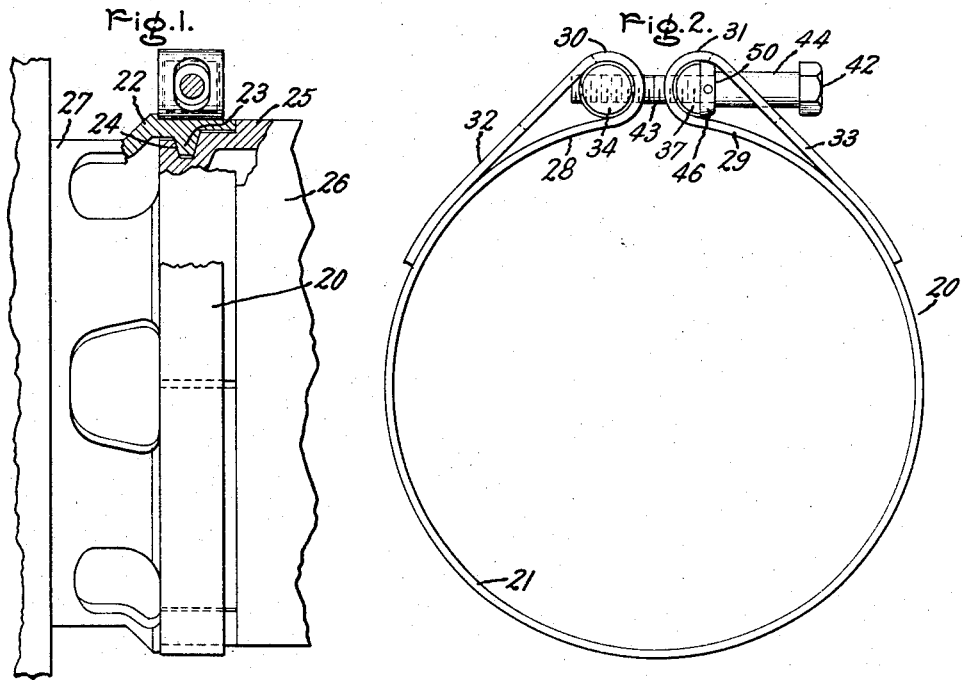
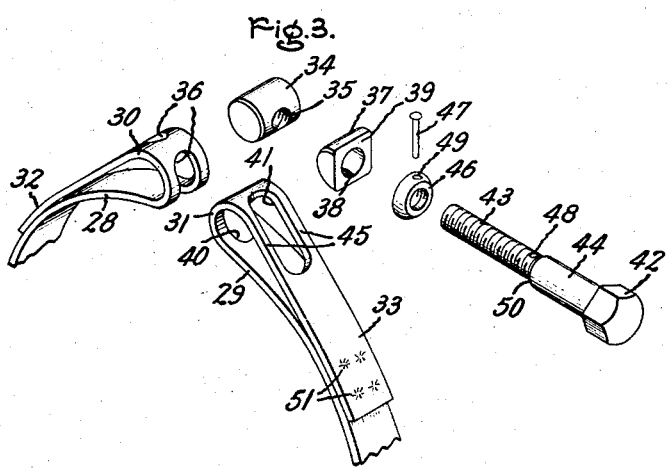
Inventors:
Irving Kalikow,
Albert H. Labastie,
by Claude A. Mott
Their Attorney.

2,874,440
HIGH PRESSURE CLAMPING BAND

Irving Kalikow, Swampscott, and Albert H. Labastie, Medford, Mass., assignors to General Electric Company, a corporation of New York Application July 19, 1954, Serial No. 444,234

2 Claims. (Cl. 24—279)

This invention relates to clamping bands and more particularly to such clamping bands of high strength which are simply and inexpensively made.

Clamps of the type here concerned ordinarily are made from steel forgings which are machined and ground and hence are very costly to manufacture. Previous band type clamps formed from a strap of thin metal have not been strong enough to withstand the tensile loads required of such bands when used as high pressure applying devices such as in mounting flanges of the type which are used for aircraft accessories and which are disclosed and claimed in U. S. Patent 2,645,438 to Irving Kalikow, a co-inventor of the present invention and assigned to the assignee of the present invention. As more particularly pointed out in the referenced patent, the vibrational forces encountered in use are high and consequently require a construction which is of high strength and which is non-resilient so that the vibrations are ineffective to produce a momentary loosening of the mounting flange at their maximum amplitudes. One of the important objectives of this invention is directed to the provision of an improved clamping band for such a construction.

Another object of this invention resides in the provision of an improved clamping band suitable for withstanding high tensile forces which is simple and easy to manufacture.

Further objects and advantages of this invention will become apparent and this invention will be better understood from the following description referring to the accompanying drawing, and the features of novelty which characterize this invention will be pointed out with particularity in the claims annexed to and forming part of this specification.

In the drawing, there is shown in Fig. 1 the fragmentary side view, partly in section, of a mounting flange construction incorporating the improved clamping band of this invention.

Fig. 2 is a side elevational view of the improved clamping band of this invention in assembled form.

Fig. 3 is an exploded perspective view of the improved clamping band of this invention illustrating the fastening means thereof.

Briefly stated, this invention provides a clamping band having tear-shaped loops at each end thereof formed by folding back the free ends of the band and providing for the reception of the fastening screw and connectors. The connectors are shaped to exactly mate with the ends of the loops to minimize resiliency due to flexure in tightening. One of the connectors has a threaded aperture for the reception of a tightening screw. The other of the connectors provides a large bearing surface which cooperates with a force distributing journal secured to the tightening screw to provide an enlarged shoulder for the screw so that a very high load may be transmitted between these parts. By providing such a force distributing member, the shank of the screw may be made small so that a slot in the loop through which the shank of the screw passes may be smaller than the force distributing journal. The folded back portions of the loop are secured to the clamping band tangentially to further reduce the resiliency of the band.

Referring now to the drawing, the reference character 20 designates generally the clamp embodying the present invention. Clamp 20 comprises a flexible metallic strip formed of any suitable metal such, for example, as 1/8" thick stainless steel and which constitutes the circular clamp band 21. The band 21 is shown as being seated around a segmented mounting flange member 22 having radially inwardly projecting wedge portions 23 which engage corresponding grooves 24 of a mating flange member 25 of an accessory 26 which is adapted to be connected to a mounting flange 27.

The band 21 is discontinuous at one point about its circumference to provide end portions 28 and 29. End portions 28 and 29 are respectively provided with back strap portions 32 and 33 which are folded back to form loops 30 and 31 respectively, and are secured to the band 21 by any suitable means such as spot welds 51. In order to obtain the minimum resiliency in the loops 30 and 31 when under tension, the back strap portions 32 and 33 are connected to band 21 at a point tangent to the periphery thereof.

A cylindrical nut 34 having a transverse threaded aperture 35 is provided for disposition in loop 30 with the aperture 35 aligned with the slots 36 in the sides of loop 30. In the preferred form, nut 34 is solid and dimensioned to nest closely in loop 30 to result in only tension forces being applied during the tightening of clamp 20 to the straps forming loop 30 which are tangential to its outer surface.

To provide a stress distributing member in loop 31 which functions in a manner similar to nut 34, a semicylindrical spacer member 37 having a transverse aperture 38 is provided. Spacer member 37 is shaped and dimensioned to closely conform to the end of loop 31 to insure that only tensile forces will be applied to the straps forming the loop 31. On its side remote from the end of loop 31 there is provided a flat bearing surface 39 to which the tightening forces are transmitted from the tightening screw as hereinafter more fully explained. Slots 40 and 41 are provided in the strap portions forming loop 31, and in use aperture 38 is aligned with these slots.

A tightening screw 42 is spanned between nut 34 and spacer 37 with the threaded end 43 of the screw being received in the threaded aperture 35 of the nut and the shank portion 44 of the screw being received in slot 41 of loop 31. Spacer 37 is slidable on the threaded portion 43 of screw 42.

In order to transmit forces between tightening screw 42 and the bearing surface 39 of spacer 37, it is essential that a load distributing means such as a shoulder on the tightening screw 42 be provided. Due to the very high pressures which must be transmitted between screw 42 and spacer member 37 to obtain the desired clamping force, such a shoulder must be larger than the diameter of the threaded portion 43. If, however, shank portion 44 of screw 42 is enlarged to provide such a shoulder, the strips of metal 45 paralleling slot 41 are reduced in cross section so that they are so drastically weakened they cannot withstand the required tightening stresses in the clamp. In order to overcome this problem, there is provided an apertured journal member 46 which is shown as being threaded on tightening screw 42 after being inserted laterally into loop 31. Journal member 46 effectively provides an enlarged shoulder for screw 42 having a diameter substantially greater than the width of slot 41 to distribute the tightening force over a large area of the bearing surface 39 of spacer 37. A shoulder 50,"

substantially smaller than the bearing surface of journal 46, is provided on the shank portion of screw 42, against which journal member 46 will seat when threaded to the limit of threaded portion 43. In this limiting position a locking pin 47 may be inserted through communicating openings 48 and 49 transverse the axis of screw 42 and journal 46, respectively. The pin 47 insures that when the screw 42 is loosened, the journal member 46 releases and turns with the screw rather than frictionally adhering to the flat surface 39 of spacer 37. During the tightening operation the frictional load or force appearing between the flat surface 39 of spacer 37 and the enlarged flat surface of journal member 46 is shared by three co-operating elements—the small shoulder 50, the engaging threads between the journal element 46 and screw 42, and the transverse pin.

The operation of the means for tightening the clamp 20 is simple and effective. By tightening the screw 42, loops 30 and 31 are drawn toward each other. Because only tension forces are applied to the strap portions forming the loop due to the construction and arrangement of nut 34 and spacer member 37, the flexibility normally encountered in thin metal bands is minimized. Moreover, because journal member 46 serves to provide tightening screw 42 with an enlarged stress distributing shoulder without seriously reducing the width of the back strap portions 45 defining opening 41, a clamp construction is provided which utilizes the maximum tensile strength of the band 21.

While there is shown and described one particular embodiment of this invention, it is to be understood that modifications thereof will occur to those skilled in the art. It is to be understood, therefore, that it is intended by the appended claims to cover all modifications which are within the spirit and scope of this invention.

What we claim as new and desire to secure by Letters Patent of the United States is:

1. A high pressure clamp assembly comprising a circular band of flexible metal having a pair of free end portions, said free end portions being folded back to form a pair of loops, a solid cylindrical nut loosely disposed within one of said loops and dimensioned for tangential engagement of the sides thereof, a solid apertured spacer loosely disposed within the second of said loops, said spacer being shaped to maintain the shape of the said end of the loop under tension and providing an opposed flat bearing surface, a tightening screw threadedly engaged in the nut and extending through a slot in said second loop and said spacer, the diameter of the shank portion of said screw being substantially equal to the width of said slot, and a journal member positioned within the second loop secured to the shank portion of said screw and providing an enlarged bearing shoulder for said screw for engaging the cooperating bearing surface of said spacer, and having a diameter substantially greater than the width of the slot for the distribution of stress therebetween.

2. A high strength clamp assembly comprising a circular band of flexible metal having a pair of free end portions, a self-formed loop on each end thereof, a fastening member disposed within one of said loops constructed and arranged to maintain the integrity of the loop under tension, a solid transversely apertured semi-cylindrical spacer member loosely disposed within the second of said loops and providing a flat bearing surface remote from the end of said loop, the outer portion of said second loop providing a screw receiving slot aligned with the aperture of said spacer member, a tightening screw threadedly engaged in the fastening member and extending through the apertured spacer and said slot, said screw having a shank portion of slightly greater diameter than the threaded portion thereof to provide a small shoulder, the diameter of said shank portion being substantially equal to the width of said slot, and an annular journal member having a diameter substantially greater than the width of said slot being positioned within said second loop, said journal member being threadedly secured to said screw abutting said shoulder and secured against rotation with respect to said screw to provide an enlarged force distributing surface for engaging the flat bearing surface of said spacer.

References Cited in the file of this patent

UNITED STATES PATENTS

| | | |
|---|---|---|
| 2,341,828 | Tetzlaff | Feb. 15, 1944 |
| 2,661,463 | Johnson | Dec. 1, 1953 |

FOREIGN PATENTS

| | | |
|---|---|---|
| 573,698 | Great Britain | Dec. 3, 1945 |
| 609,462 | Great Britain | Sept. 30, 1948 |